F. CLAWSON.
CULTIVATOR.
APPLICATION FILED OCT. 13, 1919.
1,355,812.
Patented Oct. 19, 1920.
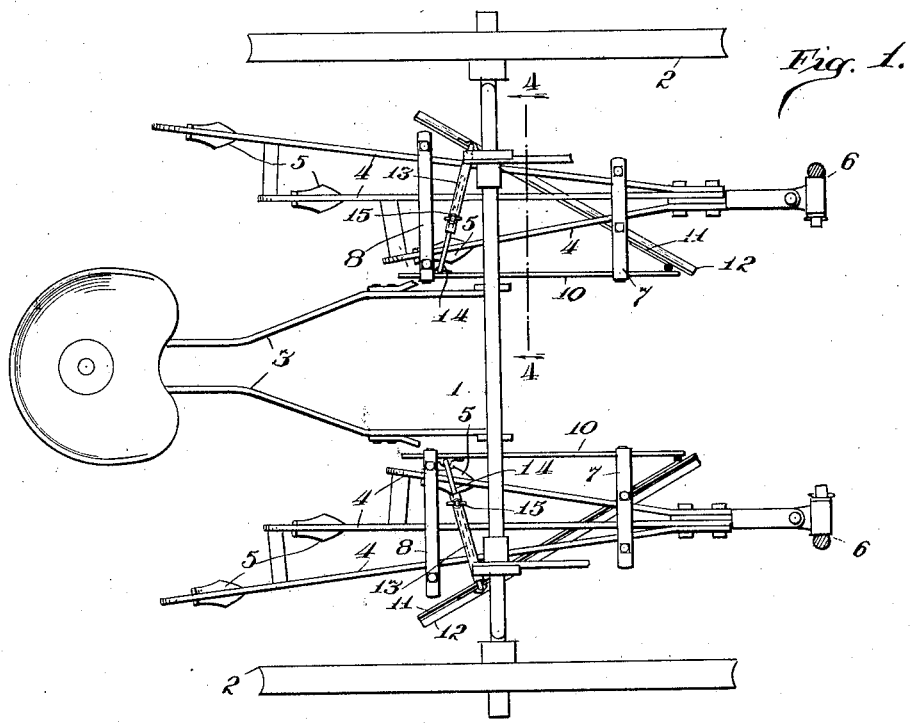
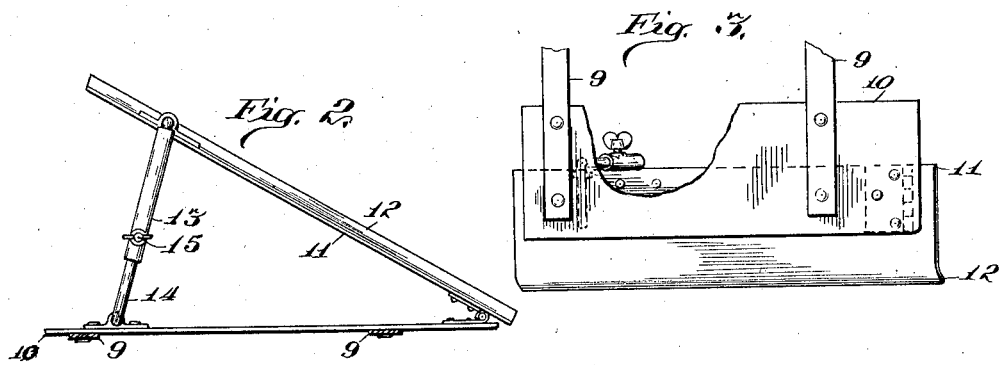
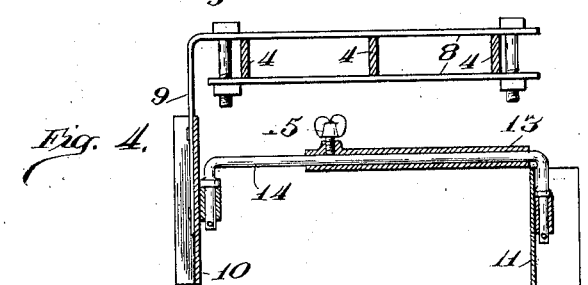
Inventor
Forest Clawson

UNITED STATES PATENT OFFICE.

FORREST CLAWSON, OF WATERMAN, ILLINOIS.

CULTIVATOR.

1,355,812. Specification of Letters Patent. Patented Oct. 19, 1920.

Application filed October 13, 1919. Serial No. 330,439.

*To all whom it may concern:*

Be it known that I, FORREST CLAWSON, citizen of the United States, residing at Waterman, in the county of Dekalb and State of Illinois, have invented certain new and useful Improvements in Cultivators; and I do hereby declare that the following is a full, clear, and exact description of the invention, such as will enable others skilled in the art to which it appertains to make and use the same.

This invention relates to improvements in cultivators, and has for its particular object to provide means for deflecting lumps of hard earth, stones and the like out of the path of the ground breaking elements of the machine and outwardly from the path of travel of the same, so that they will not be thrown inwardly upon the growing plants disposed in the row between the pairs or sets of earth breaking devices of the cultivator.

My invention is applicable to cultivators of all different makes generally marketed, and consists in the features of construction and combinations of parts hereinafter described and particularly claimed.

A suitable embodiment of the invention is illustrated in the accompanying drawings in which—

Figure 1 is a top plan view of the cultivator equipped with earth deflecting means constructed in accordance with my invention.

Fig. 2 is a fragmentary detail plan section of the cultivator showing only the ordinary guard plate and the deflecting plate of my invention together with means for adjusting the position of the latter with respect to the former.

Fig. 3 is a fragmentary detail side elevation looking at the bottom end portion of Fig. 2 and illustrating the difference in elevation between the lower edge of the guard and deflecting plates respectively.

Fig. 4 is a detail vertical transverse section on the line 4—4 of Fig. 1.

The cultivator illustrated is of an ordinary type comprising a suitable axle 1 which is supported upon the wheels 2 and on which frame elements including a seat support 3 and supporting beams for the plow beams 4 are also suitably engaged. In the instance illustrated there are two sets of three each of said plow beams 4 carrying the plow blades 5 of ordinary construction. The several plow beams are secured together at their forward ends and are also secured at said ends to draft beams 6 of well-known form.

Engaged with the horizontal upper portions of the plow beams 4 are clamping members 7 and 8 respectively, each of which is provided with a downwardly extending end projection 9 to which a guard plate 10 is secured. There are two of said guard plates 10 disposed in opposed relation to each other and preferably parallel with each other and inwardly of the paths of travel of the two sets of several plow shares or blades 5. The purpose of said plates 10 is to prevent lumps of hard earth, stones and the like from being thrown between the sets of plow shares or blades 5 during operation of the cultivator and upon the growing plants disposed in the row spanned by the axle 1 of the machine.

In practice it has been found frequently necessary for the occupant of the cultivator seat to descend from his place to manually remove large lumps of earth and stones in order to insure proper operation of the cultivator and to prevent injury to growing plants. The purpose of the present invention is to obviate this necessity and provide automatic means for insuring the removal of such lumps of earth and stones from the path of travel of the plow shares of the cultivator, and it consists in providing a pair of opposite inclined vertically disposed plates 11, hinged at their forward end portions to the forward ends of the plates 10 and having their lower edges disposed at a lower elevation than the corresponding edges of the plates 10. The lower edge portion of the plates 11 are bent to extend outwardly as shown at 12, for the purpose of stiffening the plate and also causing the same to more easily engage such lumps of earth and stones. The inclination of the plates 11 with respect to the plates 10 is rendered adjustable by means of the interfitting telescopic adjusting means shown in Figs. 2 and 3 and comprising a hollow or sleeve element 13 pivotally engaged at one end with the plate 11 and telescopically receiving a rod 14 pivotally engaged with the plate 10, the said parts being held in any position to which they are relatively moved by means of thumb screws or similar fastening means 15. Preferably the extreme forward end of the plate 11 is disposed substantially flush with the inner face of the plate 10 with which it is associated, or may extend to project inwardly of the plane of said plate 10.

The device is very simple and efficient.

While I have shown the preferred embodiment of the invention in the accompanying drawings, it will be understood, of course, that such embodiment may be changed and varied in details of construction without departing from the invention as defined in the appended claims.

I claim as my invention:

1. In a cultivator, having vertically disposed guard plates mounted between the sets of ground breaking elements thereof, a pair of vertically disposed plates extending angularly outwardly and rearwardly from the forward edges of said guard plates and in front of the ground breaking elements thereof for moving obstructive objects out of the path of the latter.

2. In a cultivator, having vertically disposed guard plates mounted between the sets of ground breaking elements thereof, a pair of vertically disposed plates hinged to the forward ends of said guard plates and extending angularly outwardly and rearwardly from the forward edges of said guard plates and in front of the ground breaking elements thereof for moving obstructive objects out of the path of the latter and adjustable spacing means connected with the rear end portions of said angular plates and a rigid part of the cultivator for permitting variation of the angularity of the said plates relatively to the guard plates.

3. In a cultivator having a plurality of transversely separated ground working elements, a vertically disposed guard plate mounted at one side of said elements, and a vertically disposed plate extending diagonally and rearwardly from the forward edge of the said guard and arranged in front of said elements for removing obstructive objects out of the path of said elements.

FORREST CLAWSON.